US006930821B2

(12) United States Patent
Kurz et al.

(10) Patent No.: US 6,930,821 B2
(45) Date of Patent: Aug. 16, 2005

(54) NONLINEAR FREQUENCY MIXER USING QUASI-PHASE-MATCHING GRATINGS HAVING BEAM-MODIFYING PATTERNS

(75) Inventors: Jonathan R. Kurz, Brooklyn, NY (US); Martin M. Fejer, Menlo Park, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 199 days.

(21) Appl. No.: 10/440,490

(22) Filed: May 16, 2003

(65) Prior Publication Data

US 2004/0227986 A1 Nov. 18, 2004

(51) Int. Cl.$^7$ .............................. G02F 1/37; G02F 1/39
(52) U.S. Cl. ..................... 359/328; 359/326; 359/330
(58) Field of Search ................................ 359/326–332

(56) References Cited

U.S. PATENT DOCUMENTS

| | | | | |
|---|---|---|---|---|
| 5,121,250 A | * | 6/1992 | Shinozaki et al. | 359/328 |
| 5,185,752 A | * | 2/1993 | Welch et al. | 372/22 |
| 5,615,041 A | * | 3/1997 | Field et al. | 359/326 |
| 6,714,569 B2 | * | 3/2004 | Zhu et al. | 372/22 |

OTHER PUBLICATIONS

Di Yang et al., "Cascaded waveguide phase–matching arrangement," Optics Letters/ vol. 25, No. 7/Apr. 1, 2000, pp. 496–498.
V. Berger, "Nonlinear Photonic Crystals," Physical Review Letters, vol. 81, No. 19, Nov. 19, 1998, pp. 4436–4439.
A. Galvanauskas et al., "Amplification in 1.2–1.7 μm communication window using OPA in PPLN waveguides," Electronics Letters, 29$^{TH}$ Apr. 1999, vol. 35, No. 9, pp. 731–733.

Kiminori Mizuuchi et al., "Second–harmonic generation with a high–index–clad waveguide," Optics Letters, Aug. 15, 1997/vol. 22, No. 16, pp. 1217–1219.
George I. Stegeman et al., "Nonlinear integrated optics," J. Appl. Phys. 58 (12). Dec. 15, 1985, 21 pp.
N.G.R. Broderick et al., "Hexagonally poled lithium niobate: a two–dimensional nonlinear photonic crystal," Physical Review Letters, vol. 84, No. 19, May 9, 2000,pp. 4345–4348.
P. E. Powers et al . . . "Continuous tuning of a continuous–wave periodically poled lithium niobate optical parametric oscillator by use of a fan–out grating design," Optical Letters, vol. 23, No. 3, Feb. 1, 1998, pp. 159–161.

* cited by examiner

*Primary Examiner*—John D. Lee
(74) *Attorney, Agent, or Firm*—Lumen Intellectual Property Services, Inc.

(57) ABSTRACT

A method and a nonlinear frequency mixer employing the method to generate at least one output light from at least one input light with the aid of a quasi-phase-matching (QPM) grating for quasi-phase-matching the input and output light involved in a nonlinear frequency mixing operation such as three-wave mixing, four-wave mixing or other nonlinear operation mediated by a susceptibility of the nonlinear optical material. The QPM grating has a beam-modifying pattern with features for wave front shaping. More specifically, the features shape the wave fronts of the output light by diffraction or phase front shaping to thereby modify its propagation. This modification of propagation can be used to steer, focus, defocusing, split and/or collimate the output light. The features themselves can have various geometric shapes and sizes, even on the order of the wavelength of the output light, and they can include domains exhibiting a nonlinear optical susceptibility χ, such as the second-order susceptibility $\chi^{(2)}$, domain edges, and/or spacings between such domains.

32 Claims, 12 Drawing Sheets

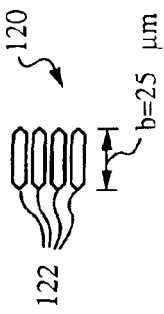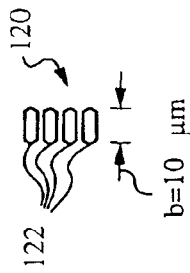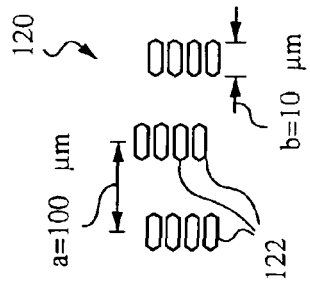
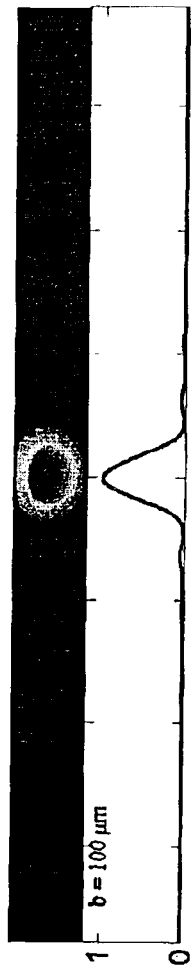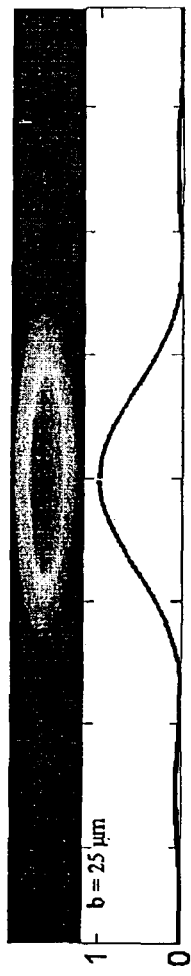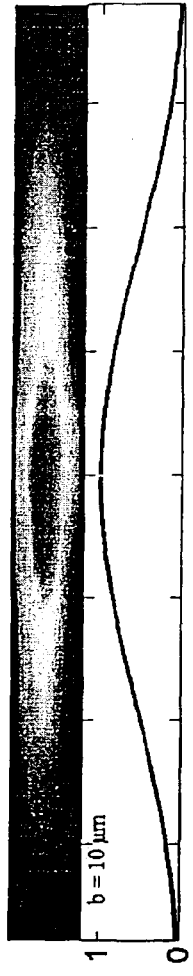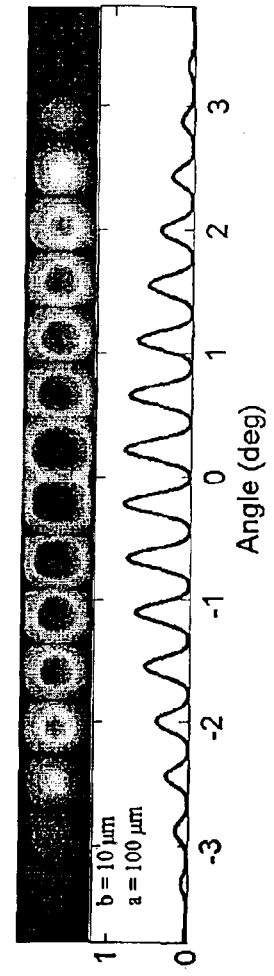
FIG. 7A   FIG. 7B   FIG. 7C   FIG. 7D

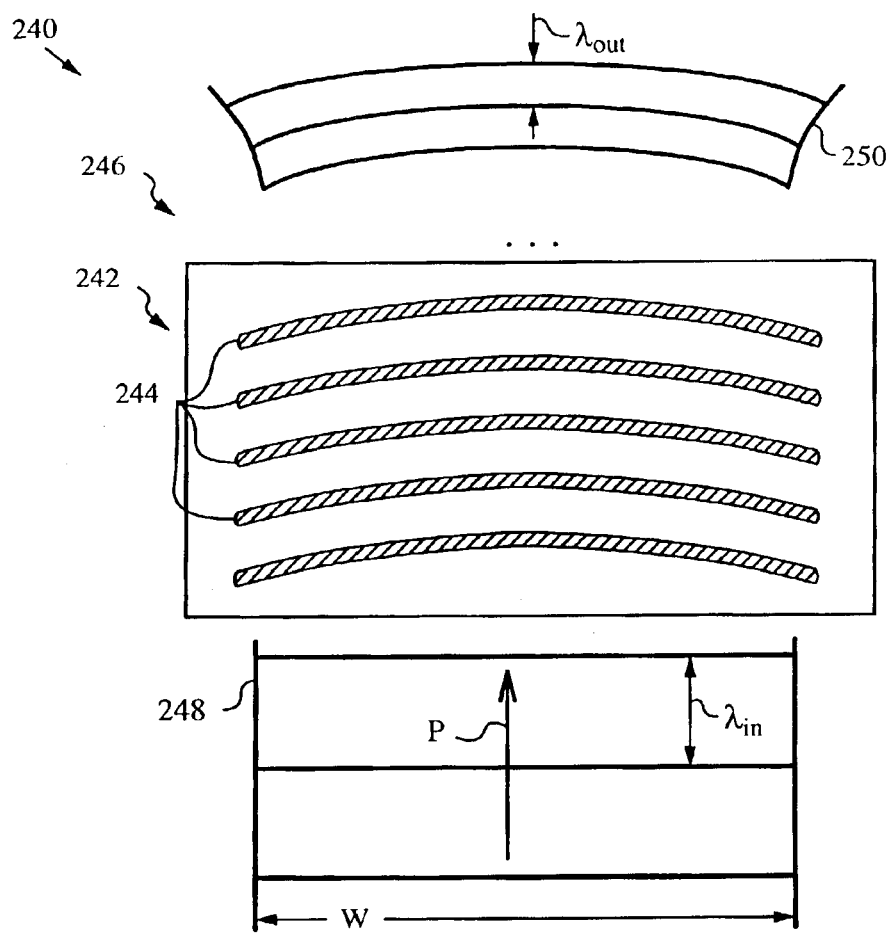
FIG. 12
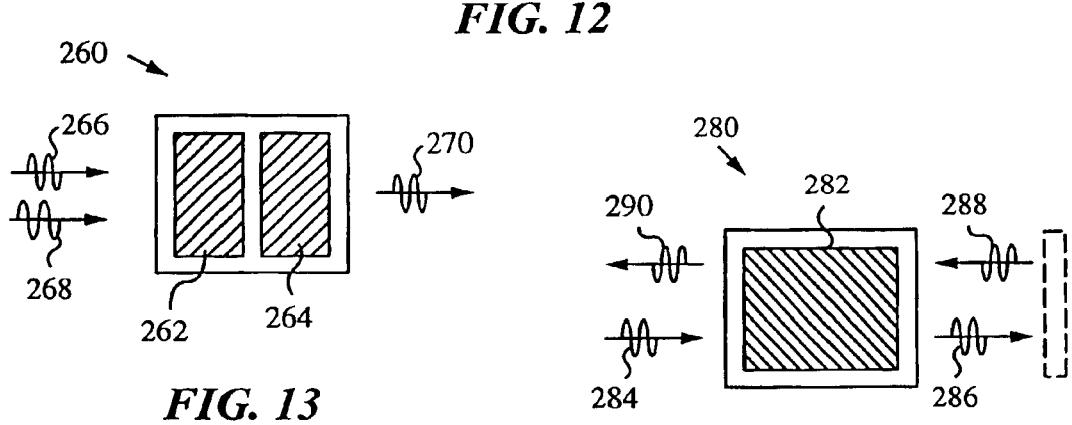
FIG. 13
FIG. 14

NONLINEAR FREQUENCY MIXER USING QUASI-PHASE-MATCHING GRATINGS HAVING BEAM-MODIFYING PATTERNS

STATEMENT OF SPONSORSHIP

This invention was supported by DARPA grant Prime MDA972-00-1-0024 and the U.S. Air Force Office of Scientific Research grant F49620-99-1-0270. The government has certain rights in this invention.

FIELD OF THE INVENTION

This invention relates to nonlinear frequency mixers employing quasi-phase-matching (QPM) gratings having patterns designed to shape or otherwise modify an output light generated by the nonlinear frequency mixer.

BACKGROUND DISCUSSION

The field of nonlinear optics has continued to develop since the early 1960s and over time has yielded solutions to many challenges encountered by optical devices and systems including generation of light at difficult to reach or inaccessible frequencies. At present, nonlinear optics encompass a wide variety of phenomena mediated by materials that are susceptible to being polarized by optical radiation. These kinds of materials are frequently called nonlinear optical materials and their susceptibility is referred to as a nonlinear optical susceptibility $\chi$. Suitable nonlinear materials include nonlinear crystals having a second-order susceptibility $\chi^{(2)}$ or higher order susceptibilities, as well as attractive optical and mechanical characteristics.

Nonlinear optical interactions occur whenever the optical fields associated with one or more beams of optical radiation, typically supplied by a laser, are large enough to produce significant polarization fields in a nonlinear material via the $\chi^{(2)}$ or higher order susceptibilities. The polarization fields thus produced are proportional to the product of two or more of the incident optical fields. Currently, such nonlinear optical processes are being used to generate new frequencies in various nonlinear processes mediated by second- and higher-order susceptibilities. These processes include three- and four-wave mixing. The most common three-wave mixing processes mediated by the second-order susceptibility $\chi^{(2)}$ are performed in nonlinear crystals and include second harmonic generation, sum frequency generation, difference frequency generation, optical parametric generation, optical parametric amplification, optical parametric oscillation and cascaded combinations of these processes.

The nonlinear polarization fields created in a nonlinear material radiate electric fields at a frequency, e.g., the second harmonic frequency, sum frequency or difference frequency. The strength of these radiated fields grows linearly with interaction distance. Therefore, efficient nonlinear frequency mixing is achieved when the interacting nonlinear polarization fields and the nonlinear frequency of the radiating electric field are maintained in phase over a long distance. For this reason, considerable efforts have been devoted during the last decade to understanding the propagation of electromagnetic waves in nonlinear materials including crystals and phasematching the nonlinear interactions over the longest possible distances. For a review of these efforts the reader is referred to Robert Boyd, Nonlinear Optics $2^{nd}$ edition, Academic Press (San Diego, 2003), Sections 2.7 and 2.9.

A prominent technique for achieving phasematching in nonlinear optical interactions is quasi-phasematching (QPM). This method is typically implemented in periodic gratings produced by reversing the sign or otherwise modulating the nonlinear optical susceptibility of the nonlinear material in the regions or domains making up the grating. Nonlinear materials in which such gratings can be successfully produced include, among other, periodically poled LiNbO$_3$ (PPLN) and LiTaO$_3$. For more information on the theory of QPM, QPM gratings and their applications the reader is referred to Martin M. Fejer, "Nonlinear Optical Frequency Conversion", Physics Today 47, 25–32 (May 1994), Martin M. Fejer, G. A. Magel, D. H. Jundt, and R. L. Byer, "Quasi-Phase-Matched Second Harmonic Generation", IEEE J. Quantum. Electron. QE-28, 2631–2654 (November 1992) or Larry E. Myers, R. C. Eckardt, M. M. Fejer, R. L. Byer, W. R. Bosenberg and J. W. Pierce, "Quasi-Phasematched Optical Parametric Oscillators using Bulk Periodically Poled LiNbO$_3$, Journal of the Optical Society of America B, Vol. 12, pp. 2102–2116 (November 1995).

Standard nonlinear frequency mixers employing QPM gratings to generate output light at a desired frequency still lack many features necessary to make them more universally accepted. In one aspect, frequency mixers with QPM gratings are typically designed to operate within a narrow band of frequencies. In other words, these devices have a narrow frequency tuning range. To overcome this limitation extended tunability or frequency-agile frequency mixers using PPLN have been proposed by implementing QPM gratings of different periods in a side-by-side configuration. An exemplary approach is described by L. E. Myers, R. C. Eckardt, M. M. Fejer, and R. L. Byer, "Multigrating Quasi-Phase-Matched Optical Parametric Oscillator in Periodically Poled LiNbO$_3$", Optics Letters, Vol. 21, pp. 591–593 (April 1996). In accordance with another approach, a transversely patterned periodic grating for QPM has been used to increase the tuning range by producing a transverse fan-out in the QPM grating. This approach is taught by Y. Ishigame et al., "LiNbO$_3$ Waveguide Second-Harmonic-Generation Device Phase Matched with a Fan-out Domain-inverted Grating", Optics Letters, Vol. 16, No. 6, pp. 375–377 (1991) and by P. E. Powers et al., "Continuous Tuning of a Continuous-Wave Periodically Poled Lithium Niobate Optical Parametric Oscillator by Use of a Fan-out Grating Design", Optics Letters, Vol. 23, No. 3, pp. 159–161 (1998).

Another limitation of frequency mixers with QPM gratings is their inability to selectively adjust parameters of interacting light beams and/or of the output light beam(s). To overcome this limitation the publication of G. Imeshev et al., "Lateral Patterning of Nonlinear Frequency Conversion with Transversely Varying Quasi-Phase-Matching Gratings", Optics Letters, Vol. 23, No. 9, pp. 673–675 (1998) describes a method for shaping the amplitude profile of an interacting beam by introducing a transverse variation in the QPM grating. Furthermore, efficient non-collinear mixing of interacting beams is provided for by two-dimensional periodic QPM structures including hexagonally-shaped domains described by N. G. R. Broderick et al., "Hexagonally Poled Lithium Niobate: A Two-Dimensional Nonlinear Photonic Crystal", Physics Review Letters, Vol. 84, No. 19, pp. 4345–4348 (2000). Similar goals can be achieved by domains of various shapes (including hexagonal) arranged in lattices, e.g., triangular lattices, as described by V. Berger, "Nonlinear Photonic Crystals", Physical Review Letters, Vol. 81, No. 19, pp. 4136–4139 (1998).

Although the patterning of QPM gratings in accordance with the above-mentioned prior art techniques has rendered QPM gratings more frequency-agile and versatile in managing the nonlinear mixing of interacting beams, there are still many operations that these devices cannot perform. Specifically, present day frequency mixers with QPM gratings cannot selectively shape and/or modulate the interacting light beams and especially the output light beam(s). Thus, any beam shaping, focusing or modulating functions have to be carried out by additional optical elements positioned outside the frequency mixer.

OBJECTS AND ADVANTAGES

In view of the above limitations of the prior art, it is a primary object of the present invention to provide frequency mixers with QPM gratings capable of performing selective beam modulating functions. In particular, it is an object of the present invention to devise QPM gratings with beam-modifying patterns that shape, focus, defocus, steer or otherwise modify the output light.

It is another object of the invention to provide a method for producing periodic and aperiodic, e.g., chirped, QPM gratings that permit wave front shaping to modify beam propagation characteristics.

It is yet another object of the invention to ensure that the QPM gratings according to the invention are easy to fabricate in commonly available nonlinear materials.

These and other objects and advantages of frequency mixers according to the invention will become apparent upon reading the ensuing detailed description.

SUMMARY OF THE INVENTION

The objects and advantages of the invention are achieved by a nonlinear frequency mixer that generates at least one output light from at least one input light with the aid of a quasi-phase-matching (QPM) grating for quasi-phase-matching the input and output light involved in the nonlinear frequency mixing operation. A beam-modifying pattern is provided in the QPM grating with features for wave front shaping of the output light. In one embodiment, the dimensions of the features of the beam-modifying pattern are on the order of the wavelength of the output light such that they produce diffraction in the output light and thus modify its propagation. In another embodiment the features extend across a beam width W of the input light. In this case the edges of the features can shape the wave front by diffraction or the features exhibit a non-uniform grating phase such that wave front shaping is achieved by phase front shaping. The features themselves are typically domains that have a nonlinear optical susceptibility $\chi$, such as the second-order susceptibility $\chi^{(2)}$, spacings between such domains or even parts of the domains, such as their edges.

The domains can have various geometric shapes such as parabolic, square, rectangular or some other polygonal shape. In one embodiment the domains have a generally hexagonal shape. In another embodiment the domains have a generally triangular shape. The sizes of the individual domains can differ but in practical implementations they will typically be about the same among each other.

In some embodiments of the invention the propagation of the wave front of output light is shaped by beam-modifying patterns that are made up of an array of domains. In a preferred embodiment the array of domains is a parabolic array. Such array is capable of modifying output light by focusing or defocusing it, depending on the direction of propagation of the output light. In another embodiment the array is a Fresnel zone plate built of the domains. In some embodiments that array can consist of a number of linear sub-arrays of domains. The sub-arrays are positioned at predetermined offsets from each other to modify the propagation of the output light as desired.

The nonlinear frequency mixer of the invention can use various types of materials for performing the frequency mixing operation. Preferably, the mixer uses crystals such as lithium niobate ($LiNbO_3$), lithium tantalate ($LiTaO_3$), KTP, RTA, KTA, RTP, ferroelectric crystals or any doped variants of these crystals. In general, however, any materials exhibiting a nonlinear optical susceptibility $\chi$ can be used. Such materials can include crystalline materials, polycrystalline materials, ceramics, glasses, amorphous materials, liquids, gases, gels, semiconductors and insulators.

The nonlinear frequency mixer can be used by itself or in combination with other optical elements. Depending on the application, the mixer can be placed in an external device such as an optical cavity, a laser oscillator, an optical parametric oscillator or an optical amplifier.

The beam-modifying pattern does not have to be uniform along the directions transverse or along the direction of propagation of the output light. In fact, in certain embodiments it is advantageous that the beam-modifying pattern exhibits a nonuniformity in the quasi-phase-matching grating along the direction of propagation of the output light. In other embodiments of the beam-modifying pattern it is advantageous to design the quasi-phase-matching grating to exhibit a nonuniformity in a direction transverse to the direction of propagation of the output light.

The invention is further embodied by a method for modifying the propagation of at least one output light issuing from a nonlinear frequency mixer by shaping the wave front of the output light. In particular, the method calls for admitting the at least one input light into the nonlinear mixer to generate the at least one output light and quasi-phase-matching the input light with the output light using a quasi-phase-matching grating. The method further calls for providing a beam-modifying pattern with features that shape the wave front of the output light by diffraction or phase front shaping and thereby modify the propagation of the at least one output light.

The features are preferably constituted by domains of nonlinear optical susceptibility $\chi$ or by spaces therebetween and are distributed so as to modify the propagation of the at least one output light. More specifically, the characteristics that can be modified include amplitude and phase of the output light. In fact, appropriate modification can result in steering, focusing, defocusing, splitting and collimating of the output light.

The nonlinear frequency mixer can generate the at least one output light with the aid of at least one nonlinear wave mixing process. For example, the mixer can take advantage of at least one three-wave mixing process that uses the second-order susceptibility $\chi^{(2)}$ of the nonlinear optical material to generate the output light. The three-wave mixing processes can include any process selected from the group consisting of second harmonic generation, sum frequency generation, difference frequency generation, optical parametric generation, optical parametric amplification, optical parametric oscillation, and optical rectification. Furthermore, the wave-mixing processes can be cascaded, e.g., second harmonic generation followed by difference frequency generation or a sub-harmonic generation and they can be performed in co-propagating or counter-propagating schemes. In a cascaded process, the output light can also end up being at the same wavelength as the input light, and the nonlinear frequency mixer can impose nonlinear phase shifts on the output light. Alternatively, the nonlinear wave mixing processes can include one or more four-wave mixing processes mediated by a higher order susceptibility of the nonlinear optical material.

The details of the invention and a number of its embodiments are explained in the detailed description with reference to the attached drawing figures.

BRIEF DESCRIPTION OF THE FIGURES

FIG. 7A–M are diagrams and graphs illustrating the performance of various beam-modifying patterns.

FIG. 12 is a diagram showing the use of gratings with a non-uniform grating phase for wave front shaping by phase front shaping.

FIG. 13 is a schematic diagram illustrating the use of a nonlinear mixer of the invention for cascaded nonlinear mixing processes.

FIG. 14 is a schematic diagram illustrating the use of a nonlinear mixer of the invention in a counter-propagating scheme.

DETAILED DESCRIPTION

Figure 1:
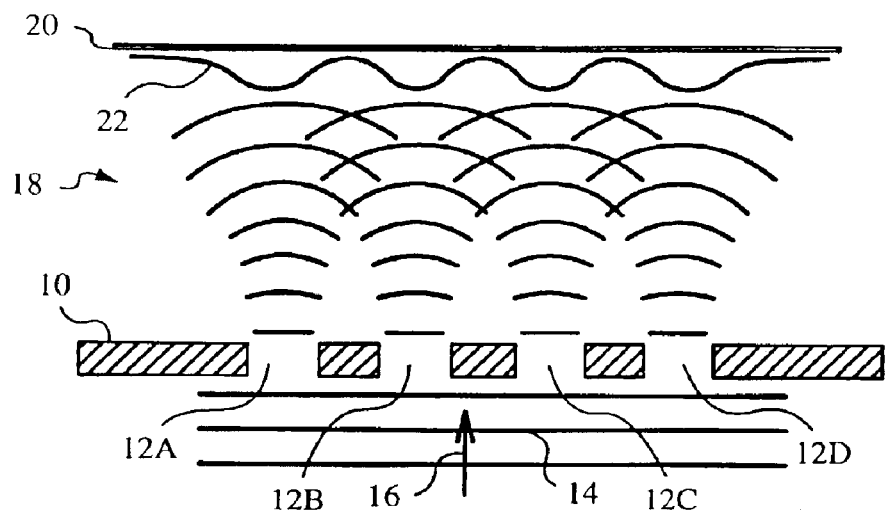
FIG. 1 (Prior Art) is a diagram illustrating the effects of diffraction in a prior art plate with four slits.

The invention will be best understood by initially referring to FIG. 1, which illustrates the well-known phenomenon of diffraction at a plate 10 with four slits 12A–D. An incoming or input light 14 is incident on plate 10 along a propagation direction 16. The wavelength of light 14 is on the order of the width of slits 12. As a result, each slit 12 allows a certain amount of input light 14 to pass, undergo diffraction and emerge in the form of output light 18. Because of diffraction, the wave fronts of output light 18 resemble an interference pattern 22 produced by four point sources positioned at the locations of slits 12A–D. A screen 20 is positioned in front of plate 10 to visualize interference pattern 22 produced by slits 12A–D. Of course, this example can be extended to one with any arbitrary number of slits, as will be appreciated by a person skilled in the art.

Interference patterns produced by slits, apertures and sharp edges and the equations governing these effects are well known. It is also known that appropriate localization of slits can take advantage of the phenomenon of diffraction to steer, focus, or otherwise modify the spatial pattern of light. One example is the Fresnel zone plate, which employs the effect of diffraction for focusing light and is found in a number of modern devices.

Among other, the present invention is based on the finding that appropriate patterning, processing and use of nonlinear optical frequency mixers employing quasi-phase-matching (QPM) gratings at selected input and output wavelengths can shape the wave front and thus modify the propagation of output light. Such modification is conveniently described in terms of diffraction effects and/or refraction effects induced by the patterning. The general theory of refraction and diffraction is well known. For the purposes of the present invention all propagation modification effects produced by the patterning will simply be referred to as diffraction.

Figure 2:
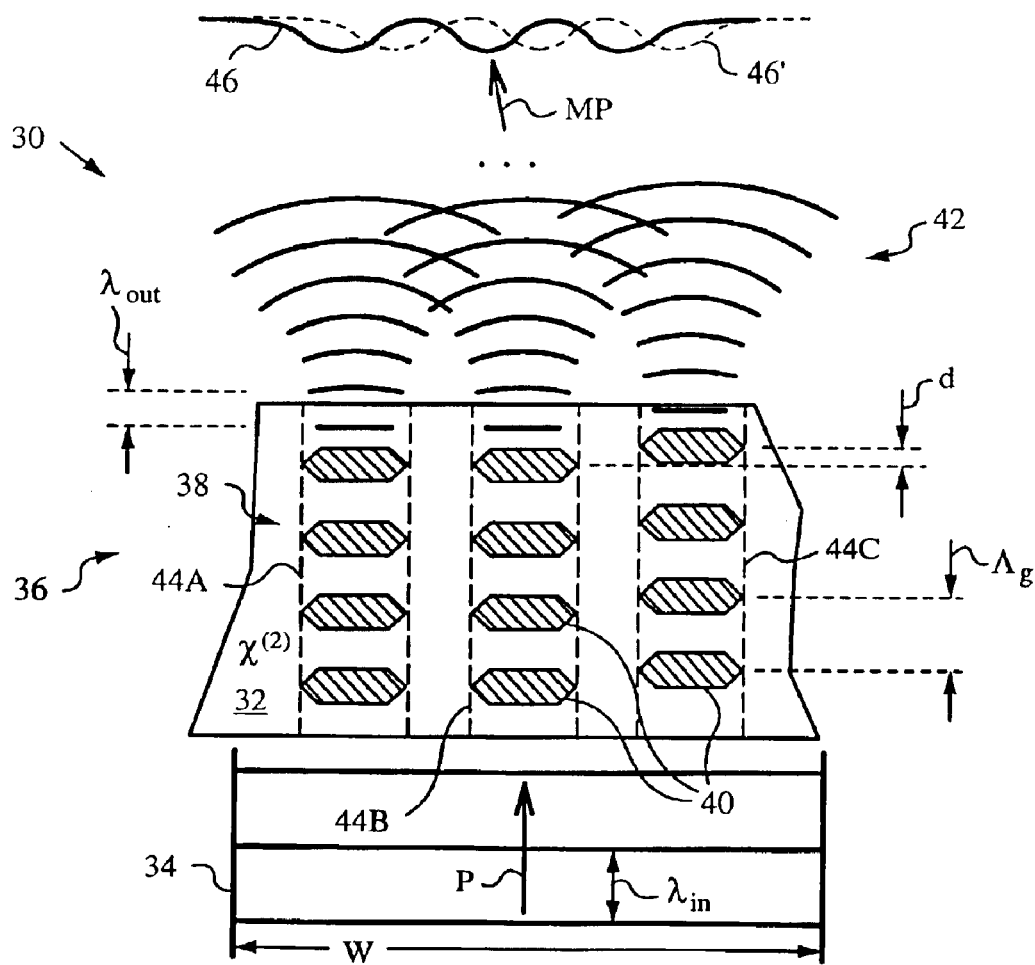
FIG. 2 is a general diagram illustrating the principles of operation of a nonlinear frequency mixer according to the invention.

The principles of operation of mixers according to the invention are explained with the aid of the general diagram in FIG. 2, which shows a portion of a nonlinear frequency mixer 30 made of a nonlinear optical material 32 possessed of a nonlinear optical susceptibility $\chi$. More specifically, in the present case material 32 has a second-order susceptibility $\chi^{(2)}$ for mediating nonlinear optical frequency processes involving three waves, hence referred to as three-wave mixing processes. It is understood that the invention also covers embodiments where material 32 has a higher order nonlinear optical susceptibility for mediating four-wave mixing processes or still other mixing processes. Among the most common nonlinear frequency mixing processes that can be performed by mixer 30 are three-wave mixing processes including second harmonic generation, sum frequency generation, difference frequency generation, optical parametric generation, optical parametric amplification, optical parametric oscillation, optical rectification as well as sub-harmonic generation.

Materials exhibiting suitable nonlinear optical susceptibilities include a wide variety of solids, gels and even gases. In fact, material 32 can be selected from among crystalline materials, polycrystalline materials, ceramics, glasses, amorphous materials, liquids and gases. Material 32 can also be a semiconductor or an insulator. When using gases, liquids or gels the QPM structures (described below) can be created using arrays of cells that contain the nonlinear optical material, or by selectively filling parts of a porous structure with the nonlinear optical material. Preferably, material 32 is a crystal such as a lithium niobate, lithium tantalate, KTP, RTA, KTA, RTP, ferroelectric crystal or any doped variant of these crystals. In the present embodiment material 32 is lithium niobate ($LiNbO_3$).

Rather than a regular QPM grating, which typically comprises domains extending across an entire width W of a beam of input light 34, mixer 30 has a QPM grating 36 with a beam-modifying pattern 38 made up of a number of domains 40. In the present case, domains 40 are produced by poling material 32 through appropriate application of an electric field, as is known to those skilled in the art. In general, however, techniques for producing domains 40 will vary depending on the type of material 32 selected. For example, in liquids, gases and soft materials porous QPM structures can be micro-machined or created by self-assembly of micron-sized particles.

For reasons of clarity, FIG. 2 illustrates only a portion of QPM grating 36. In this portion, beam-modifying pattern 38 consists of 12 domains 40 arranged in the form of an array with three columns and four rows, or three vertical stripes 44A, 44B and 44C with four domains in each stripe. A distance between rows of domains 40 along a direction of propagation P of input light 34 defines a grating period $\Lambda_g$. Grating period $\Lambda_g$ is selected such that QPM grating 36 quasi-phase-matches input light 34 with an output light 42 generated through a three-wave nonlinear optical interaction mediated by second-order susceptibility $\chi^{(2)}$ of material 32. The principles of QPM are well known to those skilled in the art and they will be able to determine the appropriate grating period $\Lambda_g$ to ensure that any chosen three-wave mixing operation is efficiently performed.

In the present case, grating period $\Lambda_g$ of QPM grating 36 is selected to quasi-phase-match the nonlinear operation of second harmonic generation (SHG). In SHG the frequency of input light 34 is doubled or, equivalently, an input wavelength $\lambda_{in}$ of input light 34 is reduced to one half of its value in output light 42 such that:

$$\lambda_{out} = \frac{1}{2}\lambda_{in},$$

where $\lambda_{out}$ is the output wavelength of output light 42. For illustration purposes, wavelengths $\lambda_{in}$ and $\lambda_{out}$ are marked as successive wave fronts separated by a phase of $2\pi$.

In accordance with the invention, domains 40 of beam-modifying pattern 38 represent features on the order of a wavelength of output light 42. Specifically, the dimensions of features 40 transverse to the direction of propagation P of input light 34 are substantially on the order of output wavelength $\lambda_{out}$. Therefore, successive columns of domains 40 act as if they were slits with respect to output light 42 being generated by SHG from input light 34. As a result, features 40 shape the wave fronts of output light 42 by diffraction and thus modify its propagation. For this condition to hold, output wavelength $\lambda_{out}$ can be anywhere from several times smaller to several times larger than the transverse dimensions of features 40. Less pronounced diffraction and hence somewhat different modification of propagation of output light 42 will take place if transverse dimensions of features 40 are substantially within an order of magnitude of output wavelength $\lambda_{out}$ or even more.

In general, in the absence of depletion and cascaded nonlinear effects occurring simultaneously in the same QPM grating (see below), features 40 only affect the nonlinear mixing output or output light 42. Therefore, input light 34 is not modified by beam-modifying pattern 38 of QPM grating 36. However, in cases where the nonlinear mixing process is so strong and/or efficient that there is enough output light 42 to serve as pump light for a second (cascaded) nonlinear mixing process that involves input light 34, then features 40 will affect input light 34. In this case features 40 can modify input light 34 by imposing nonlinear phase shifts, particularly if the device is operated away from the phasematching condition.

The simple "hard aperture" diffraction grating analogy described above holds in the operation regime where the length of QPM grating 36 is short in comparison to the Rayleigh range of input light 34, so that diffraction of input light 34 within mixer 30 is negligible. On the other hand, it is usually not important if diffraction of output light 42 takes place within mixer 30. In fact, significant diffraction of output light 42 will generally happen soon after output light 42 is created by the nonlinear mixing process. However, diffraction of input light 34 through mixer 30 causes a change in initial conditions. Specifically, instead of starting out with input light 34 having flat phase fronts as shown in FIG. 2, input light 34 develops curved phase fronts as it travels toward the other end of mixer 30. Such change in conditions will affect the way in which diffraction grating 36 modifies the propagation of output light 42.

It should be noted that although conditions in which input light 34 experiences negligible diffraction are simple, they are not necessary. In fact, the methods and nonlinear mixers of the invention can accommodate more complicated situations in which input light 34 does undergo non-negligible diffraction or depletion in propagating through the mixer. For example, more phase curvature can be provided for output light 42 by adjusting beam-modifying pattern 38 of QPM grating 36 to compensate for the phase curvature acquired by input light 34. In addition, more efficient mixing can be effectuated at the end of mixer 30 to compensate for depletion of input light 34 by efficient frequency conversion.

In the portion of beam-modifying pattern 38 shown in FIG. 2 two stripes 44A, 44B of features 40 are laterally aligned while stripe 44C is not. In other words, beam-modifying pattern 38 introduces a transverse non-uniformity in QPM grating 36. Specifically, third stripe 44C of features 40 is shifted or offset from stripes 44A, 44B by an offset distance d, as indicated. Distance d can vary from a very small value up to the length of grating period $\Lambda_g$.

Stripes 44A, 44B, 44C behave like slits, and changing their positions with respect to each other along the direction of propagation P of input beam 34 changes the relative phase of output light 42 generated by stripes 44A, 44B, 44C. Thus, output light 42 emerging from stripes 44A, 44B is in phase, while output light 42 emerging from stripe 44C is offset by a phase offset $\phi$ calculated as follows:

$$\phi = \frac{2\pi d}{\Lambda_g}.$$

Phase offset $\phi$ further modifies the direction of propagation of output light 42 as indicated by arrow MP thereby changing the intensity distribution 46 of output light 42 in the far field. For comparison, the position of the peaks in intensity distribution 46' of output light 42 whose propagation is modified by stripes 44A, 44B, 44C without phase offset $\phi$ (i.e., for d=0) is indicated in dashed lines.

The example of FIG. 2 illustrates how QPM grating 36 with a beam-modifying pattern 38 of domains or features 40 uses the phenomenon of diffraction to shape wave fronts of output light 42 to modify its propagation and control its intensity distribution 46 in the far field. In fact, two mechanisms are involved in modifying the propagation of output beam 42. The first mechanism is due to diffraction produced by stripes 44A–C acting as slits for output light 42 at output wavelength $\lambda_{out}$. The second mechanism relies on the relative position between stripes 44A–C (which a person familiar with the art will recognize as an effect related to a type of "phase mask", a diffractive optical element commonly used for beam shaping) to modify the relative phases of output light 42 emerging from stripes 44A–C.

The principles of controlling the intensity distribution (i.e., amplitude) and phase can be employed to produce various types of beam-modifying patterns consisting of arrays of features with phase-shifted stripes. In fact, one can approximate any desired phase profile across a beam of output light in discrete steps that are limited by the minimum width of the stripes and their spacing. Moreover, as a person skilled in the art will understand, this mechanism can be applied to one or more output wavelengths in any three-wave or four-wave nonlinear frequency mixing process.

However, for purposes of clarity, the following discussion will consider the three-wave mixing process of SHG in the below exemplary embodiments of nonlinear frequency mixers.

Figure 3:
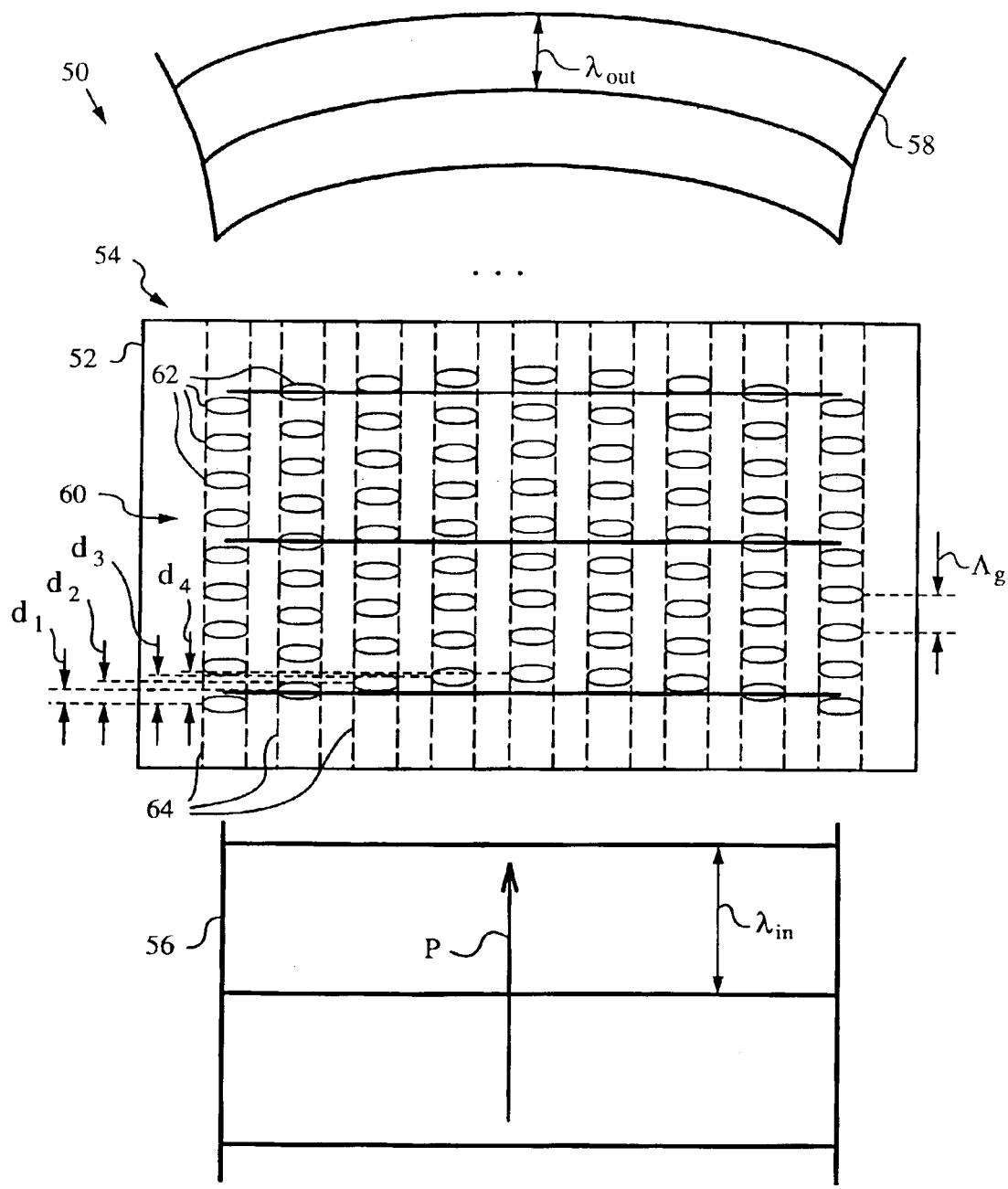
FIG. 3 is a top plan view of a nonlinear frequency mixer using an array of domains arranged in a parabolic beam-modifying pattern according to the invention.

FIG. 3 shows a nonlinear frequency mixer 50 employing as nonlinear optical material 52 a crystal of $LiNbO_3$. Mixer 50 has a QPM grating 54 with a grating period $\Lambda_g$ chosen for generating from an input light 56 at an input wavelength $\lambda_{in}$ an output light 58 at an output wavelength $\lambda_{out}$ that is the second harmonic of input wavelength $\lambda_{in}$ (i.e., $\lambda_{out}=\lambda_{in}/2$) QPM grating 54 is endowed with a beam-modifying pattern 60 made up of an array of domains 62. More precisely, the array is built up of a number of stripes 64 of domains 62.

Stripes 64 are offset from each other by offset distances $d_i$ as measured along a direction of propagation P of input light 56. Offset distances $d_i$ are chosen such that the array of domains 60 is parabolic. In other words, stripes 64 are offset by distances $d_i$ that produce a parabolic phase profile in output light 58.

During operation, mixer 50 produces output light 58 whose output wavelength $\lambda_{out}$ corresponds to the second harmonic of input wavelength $\lambda_{in}$. The parabolic profile of the array of domains 62 belonging to beam-modifying pattern 60 modifies the propagation of output light 58 to produce a diverging beam of output light 58 in the far field. In fact, the parabolic profile of the array of domains 62 acts as a cylindrical lens having a focusing strength in the plane of the paper. Along propagation direction P the parabolic profile of the array causes output light 58 to diverge. On the other hand, when input light 56 is incident on mixer 50 from the opposite side, then output light 58 converges to a focal spot (not shown) defined by the effective cylindrical lens.

It should be noted that cases where two-dimensional beam shaping (e.g., two-dimensional beam focusing instead of only one-dimensional cylindrical focusing) is required can also be accommodated. In those instances the QPM grating is patterned with a three-dimensional array of domains. While three-dimensional periodic poling is currently challenging to achieve, one possibility for creating a three-dimensional array is to stack and bond thin two-dimensional arrays. Alternatively, two standard two-dimensional devices can be cascaded and oriented at 90 degrees to each other in the plane normal to the direction of propagation of the output light. Such arrangement ensures that the output light beam is shaped in one dimension by the first two-dimensional device, and then in the other (orthogonal) dimension by the second two-dimensional device.

Figure 4:
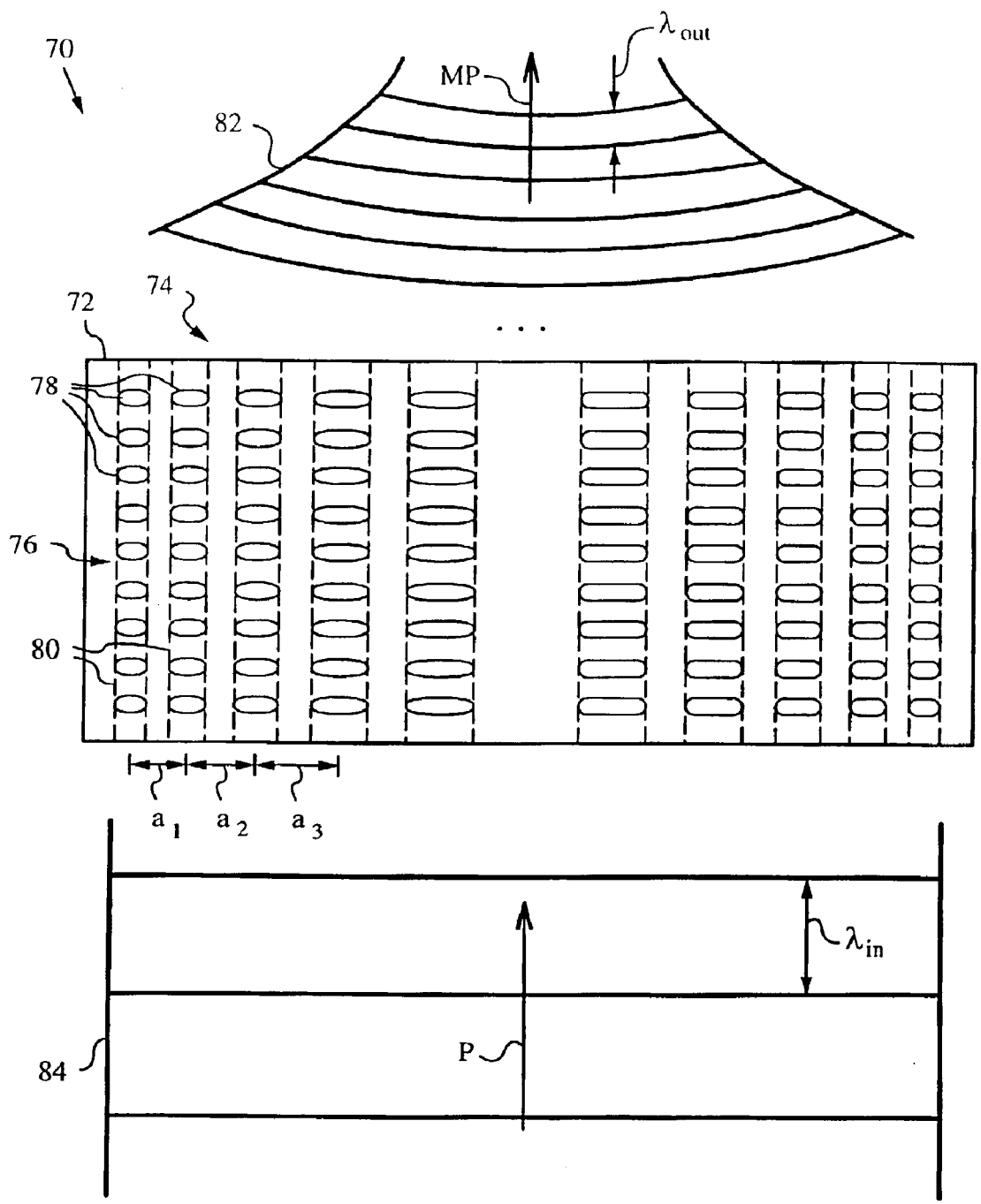
FIG. 4 is a top plan view of a nonlinear frequency mixer using an array of domains defining a Fresnel zone plate according to the invention.

FIG. 4 shows a nonlinear frequency mixer 70 in a top plan view. Mixer 70 employs as nonlinear optical material 72 a crystal of $LiNbO_3$. Furthermore, mixer 70 has a QPM grating 74 endowed with a beam-modifying pattern 76 made up of an array of domains 78 arranged in stripes 80. The array of domains 78 defines a Fresnel zone plate by gradually increasing width of domains 78 in successive stripes 80 and gradually increasing transverse spacings $a_i$ between domains 78 in successive stripes 80 toward the center of mixer 70 from both sides.

In this embodiment both the widths of domains 78 and spacings $a_i$ between them serve as features for modifying the propagation of an output light 82 generated from an input light 84. For this reason, the widths and spacings are on the order of an output wavelength $\lambda_{out}$ of output light 82. As in the previous embodiments, QPM grating 74 is used for SHG such that output light 82 is the second harmonic of input light 84 (i.e., $\lambda_{out}=\lambda_{in}/2$).

Figure 5:
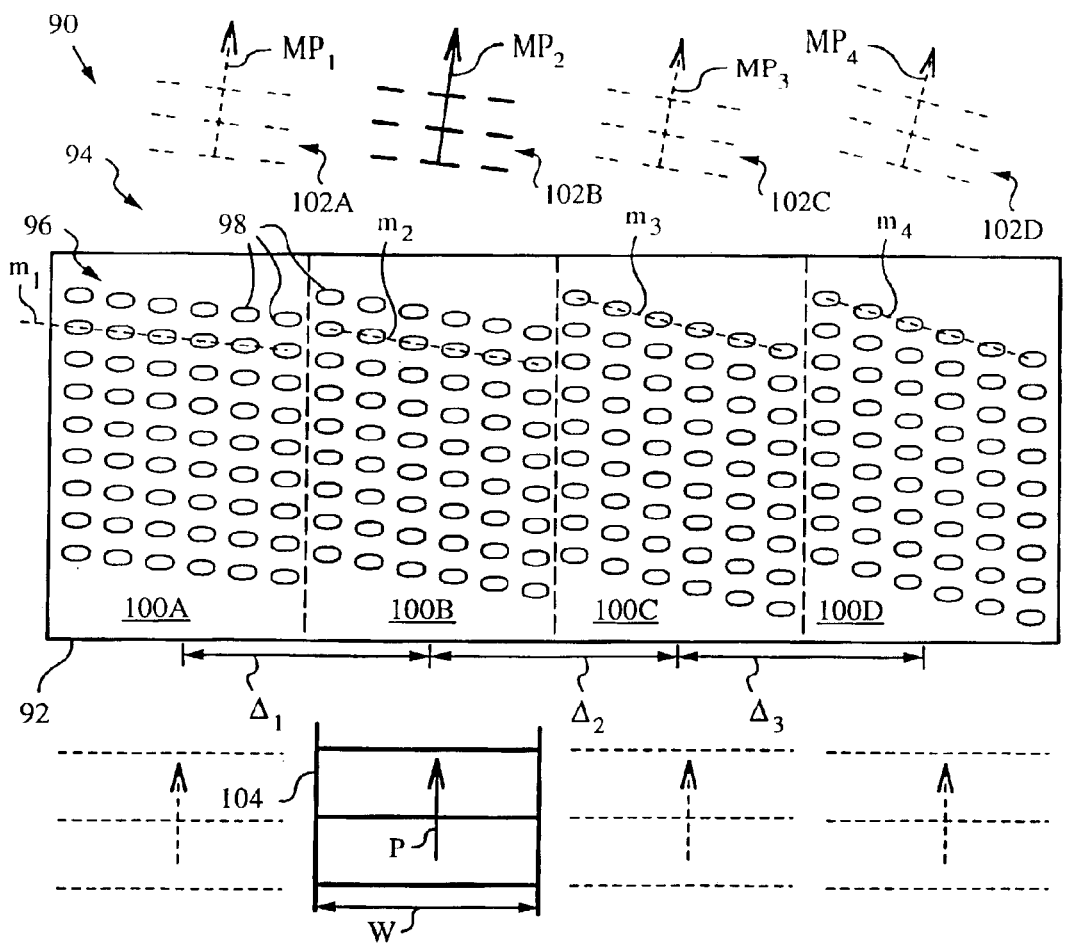
FIG. 5 is a top plan view of a nonlinear frequency mixer employing a number of sub-arrays of domains having varying slopes.

FIG. 5 illustrates yet another embodiment of a nonlinear frequency mixer 90 according to the invention. Once again, mixer 90 uses $LiNbO_3$ as optical material 92 and a QPM grating 94 exhibiting a beam-modifying pattern 96 consisting of an array 100 of domains 98.

In contrast to previous embodiments, array 100 is made up of a number of sub-arrays 100A, 100B, 100C and 100D. Each one of sub-arrays 100A–D has domains 98 arranged at different slopes $m_i$.

In other words, slopes $m_i$ of rows of domains 98 are equal in each sub-array but differ from one sub-array to the next. In addition, sub-arrays 100A–D are positioned at certain transverse separations or offsets $\Delta_i$.

Mixer 90 is designed for producing output light 102 in the form of sub-beams 102A–D from a beam of input light 104 at input wavelength $\lambda_{in}$ by the nonlinear process of SHG. Because of the differences in slopes $m_i$, sub-beams 102A–D issue from corresponding sub-arrays 100A–D with different propagation characteristics $MP_i$ for each sub-beam 102A–D.

Preferably, mixer 90 is built such that the beam of input light 104 propagating along a propagation direction P has a width W that is approximately equal to or smaller than transverse offsets $\Delta_i$. Thus, input light 104 can be passed separately through any one of sub-arrays 100A–D by displacing mixer 90 transversely to propagation direction P. Alternatively, the beam of input light 104 can be displaced transversely by any appropriate means, e.g., an optical steering apparatus (not shown) as shown in dashed lines. In the embodiment of FIG. 5 input light 104 is directed to pass through sub-array 100B and it thus exits mixer 90 as sub-beam 102B at output wavelength $\lambda_{out}=\lambda_{in}/2$ and propagation characteristics $MP_2$.

From the above it is clear that a nonlinear frequency mixer with a QPM grating made up of a single array of features or sub-arrays of features can use amplitude and/or phase control through appropriate localization of features to modify the propagation of output light. The QPM grating does not have to be periodic along the longitudinal direction. For example, the QPM grating can exhibit a beam-modifying pattern according to the invention and be chirped, e.g., to compensate for spatial or chromatic dispersion. Alternatively, the QPM gratings can be aperiodic. A QPM grating with an array of different chirps can also be used to obtain an angular deflection proportional to frequency; such a device can be used as the basis of a frequency-to-space converter, or even a time-to-space converter when the input light is suitably chirped in frequency.

Figure 6A:
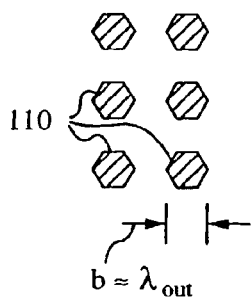
FIG. 6A–C are diagrams illustrating various types of domains in accordance with the invention.
Figure 6B:
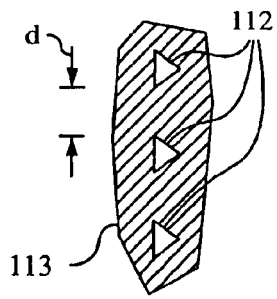
Figure 6C:
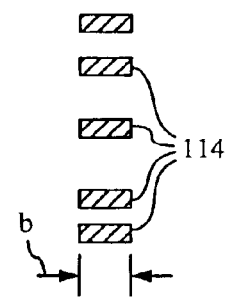
Figure 7E:
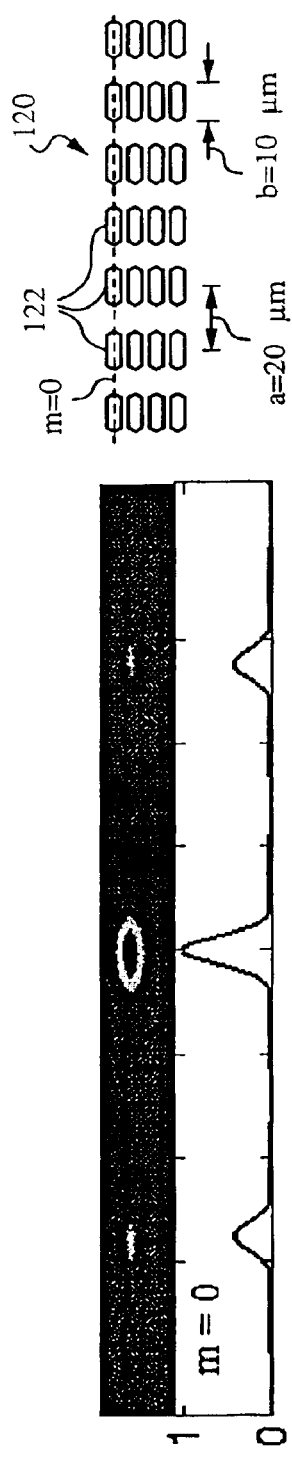
Figure 7F:
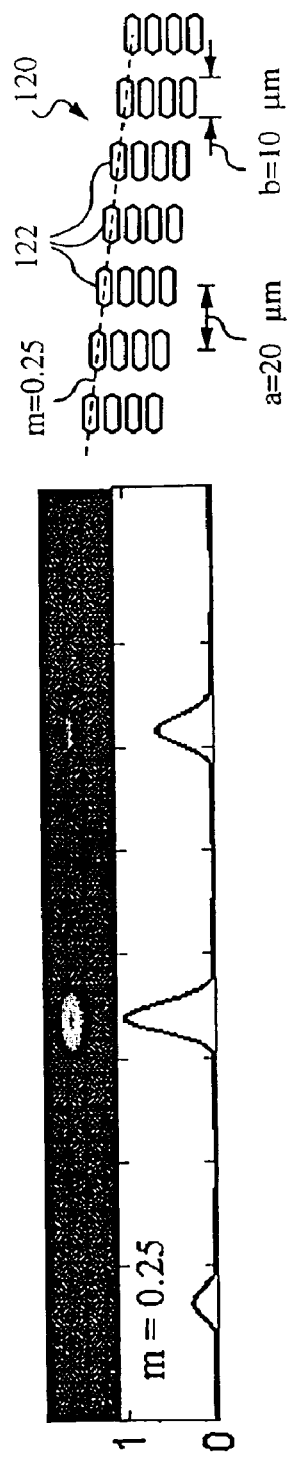
Figure 7G:
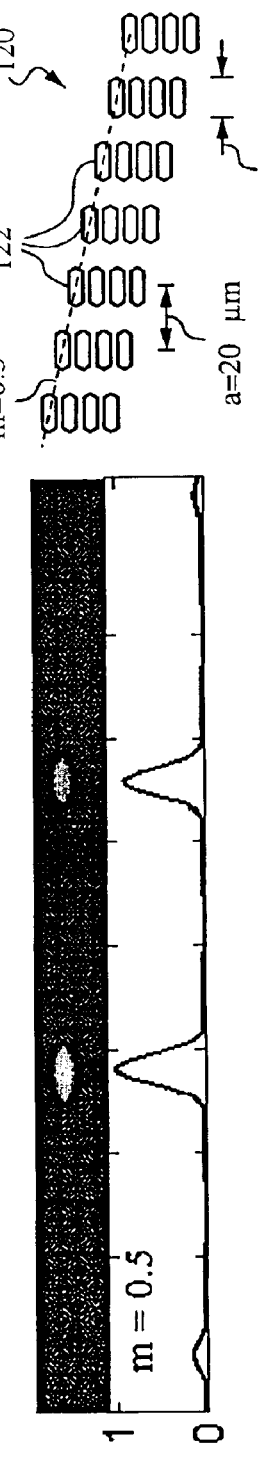
Figure 7H:
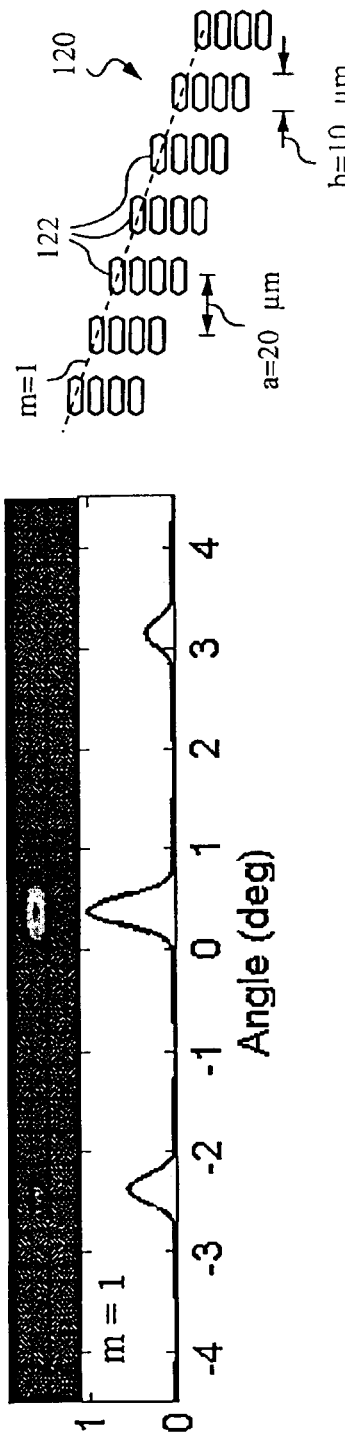
Figure 7I:
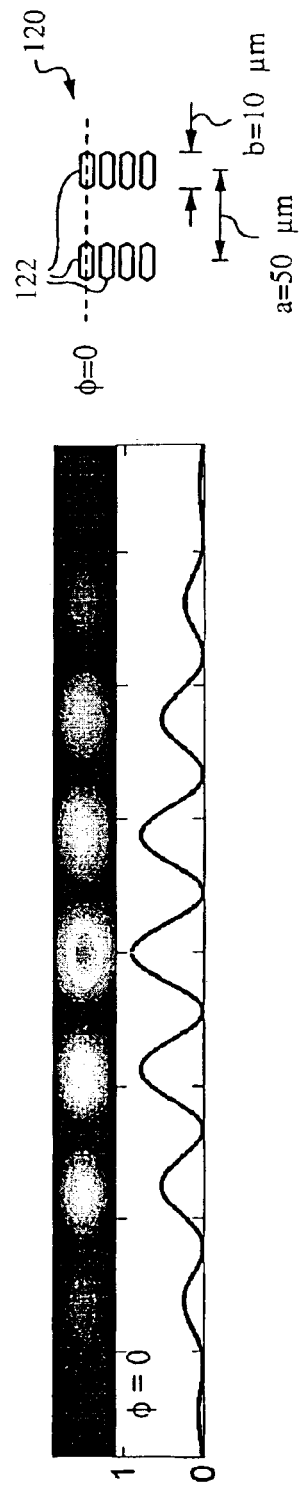
Figure 7J:
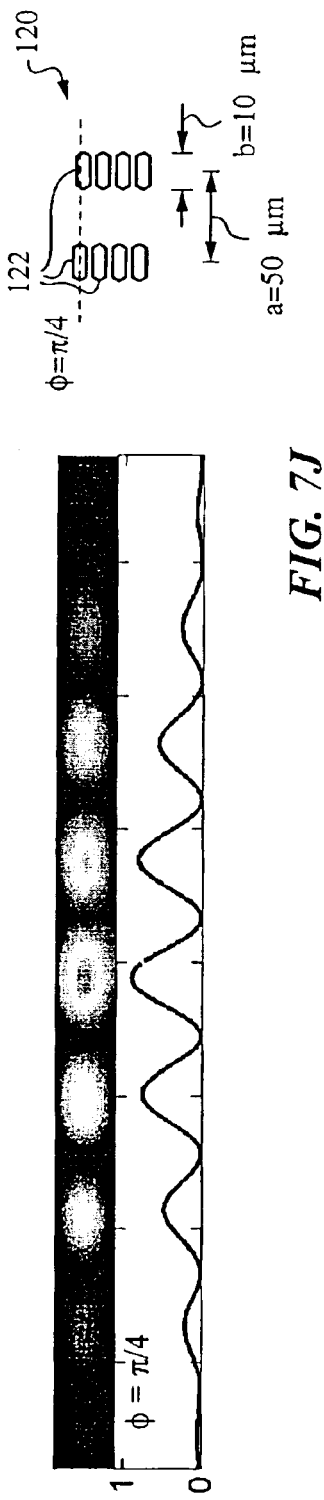
Figure 7K:
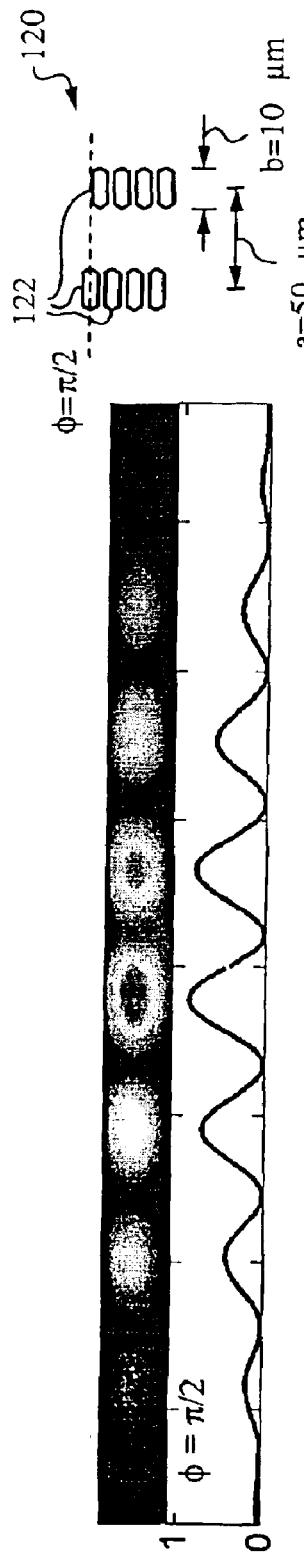
Figure 7L:
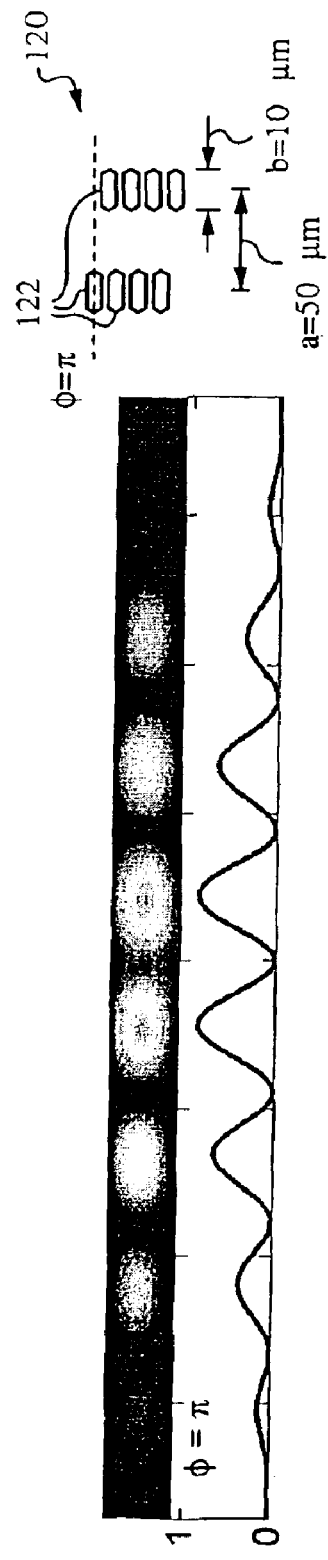
Figure 7M:
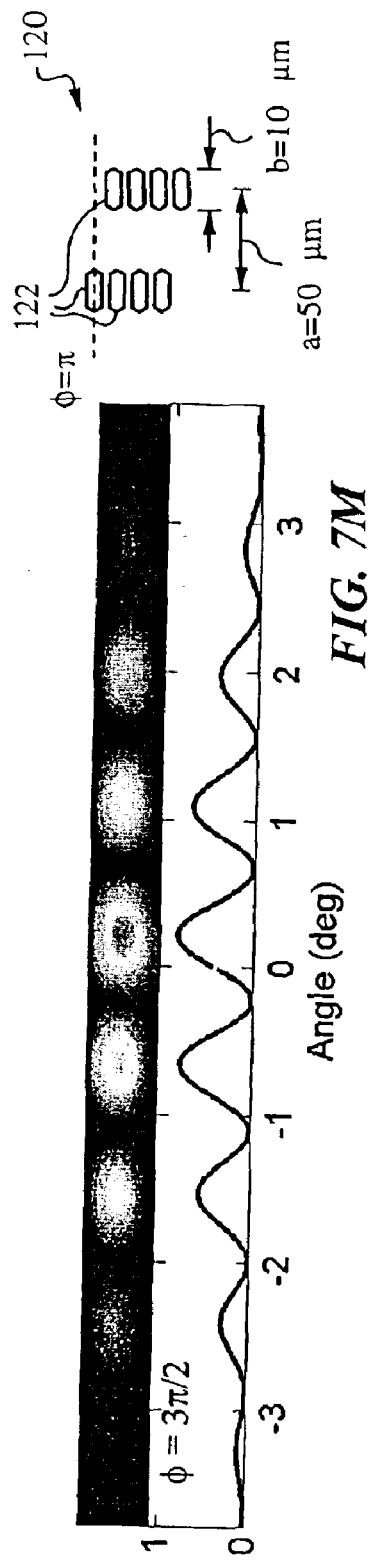

The diagrams in FIGS. 6A–C illustrate a number of possible shapes of domains that can be used by QPM gratings according to the invention. In particular, FIG. 6A illustrates hexagonally shaped features 110 that are the poled domains of a QPM grating. All features 110 have a width "b" that is on the order of output wavelength $\lambda_{out}$. FIG. 6B illustrates triangular features 112 in a nonlinear material 113 spaced apart by longitudinal distances "d" that are the equivalent of the grating period $\Lambda_g$ if the direction of beam propagation is the same for A, B, and C. (The fact that the domains are triangular will have an effect on the efficiency across each individual domain, but this is a small deviation from the originally intended beam propagation to the overall QPM effect.) It should be noted that features 112 are areas of the QPM grating where a nonlinear material 113 is not poled. Alternatively, features 112 can be the poled domains. FIG. 6C shows rectangular features 114 that are domains of width "b" on the order of output wavelength $\lambda_{out}$. Features 114 exhibit an aperiodic spacing along the longitudinal direction.

The diagrams of FIGS. 7A–M further illustrate the far-field intensity distributions due to diffraction produced in output light by a number of exemplary beam-modifying patterns 120 of features 122 shown to the right of the intensity distributions. The top graphs are the measured intensity distributions while the graphs below represent expected intensity distributions as a function of angle. In beam modifying patterns 120 "b" denotes the widths of features 122, "a" denotes their transverse spacing, "m" is the geometric slope of the grating patterns expressed as a ratio of longitudinal displacement divided by transverse displacement and "φ" is the phase difference introduced by offset distance between successive stripes of features.

Figure 8:
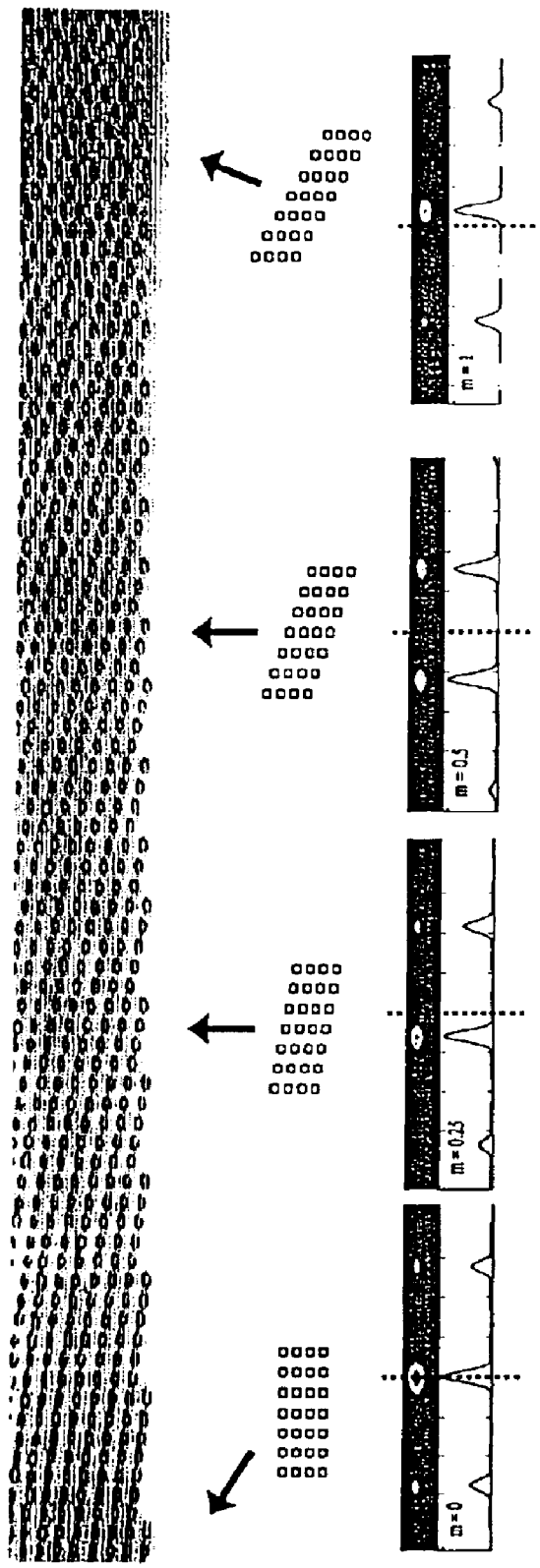
FIG. 8 are diagrams and graphs illustrating the performance of a beam-modifying pattern having a number of sub-arrays exhibiting a parabolic phase slope.

FIG. 8 is a diagram illustrating the results for a continuously tuned QPM grating with sub-arrays having a parabolic phase slope (parabolic phase slope is equivalent to a linearly increasing slope of rows). The slope is effectively constant over the width of the beam and the tuning is cyclical as the phase between grating stripes exceeds $2\pi$ (or equivalently, when $d>\Lambda_g$).

Figure 9A:
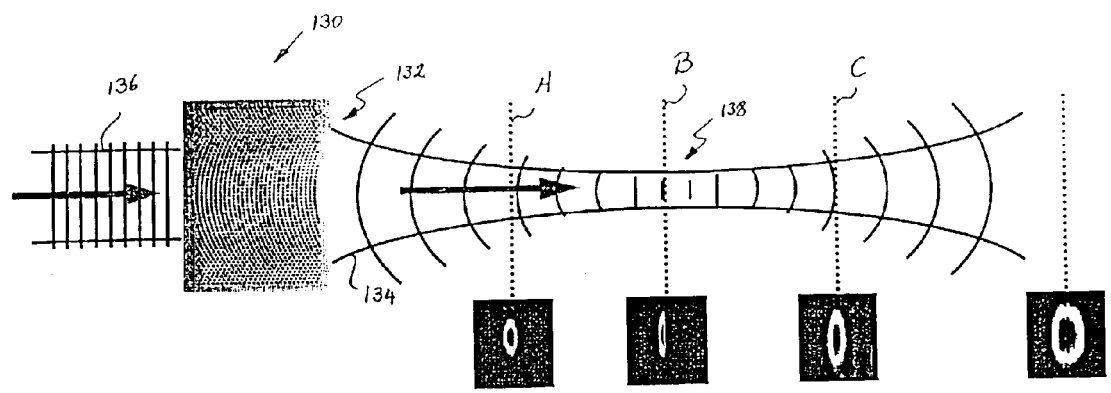
FIG. 9A–B are diagrams illustrating the operation of a nonlinear frequency mixer utilizing a parabolic phase array in accordance with the invention.
Figure 9B:
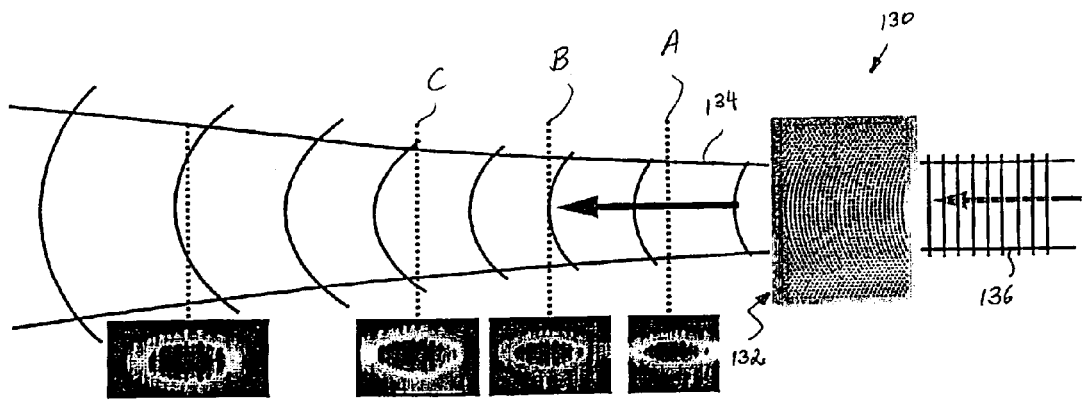

FIG. 9A illustrates the operation of a nonlinear frequency mixer 130 utilizing a parabolic phase array 132 for focusing a beam of output light 134 obtained through a nonlinear mixing operation from an input light 136. Output light 134 is focused to a spot 138 whose cross-sectional intensity distribution is indicated at points A, B and C. The focal length of array 132 is 5 cm (f=5 cm). FIG. 9B illustrates the operation of mixer 130 in reverse such that nonlinear frequency mixer utilizing array 132 for expanding or defocusing output light 134. In this case the focal length is −5 cm (f=−5 cm).

Nonlinear frequency mixers designed with QPM gratings having beam-modifying patterns according to the invention perform nonlinear frequency conversion and simultaneously modulate the propagation of output light. By unifying these two functions in a single element such mixers obviate the need for additional optical elements previously needed for modifying the propagation of output light. The mixers of the invention can steer, shape, focus, defocus and/or otherwise modify the propagation of output light by controlling its phase and amplitude as described above. The various beam-modifying patterns described above enable a person of average skill in the art to design a beam-modifying pattern that produces a range of useful amplitude and phase modulations to guide the output light as desired. It should also be noted that the QPM gratings bearing the beam-modifying patterns according to the invention can be manufactured in commonly available nonlinear materials including crystals.

Figure 10:
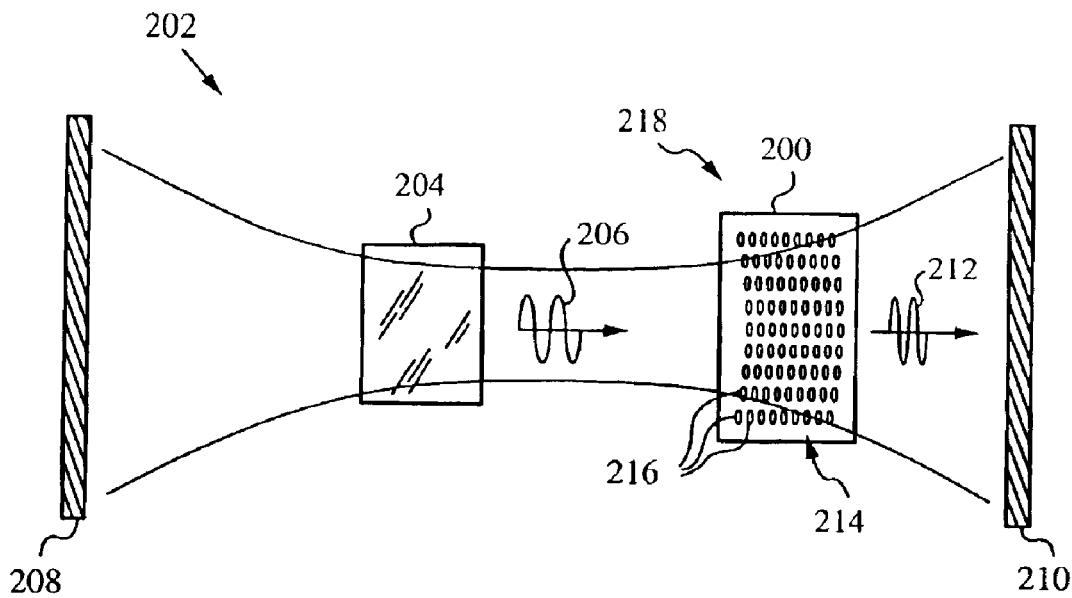
FIG. 10 is a schematic diagram illustrating a nonlinear frequency mixer according to the invention in an optical cavity.

Integration of nonlinear frequency conversion and modulation of the output light into a single mixer is very advantageous. Specifically, mixers integrating both of these functions can be employed in optical systems to reduce their overall complexity. In one exemplary application a nonlinear frequency mixer 200 capable of also focusing light is used in an optical cavity 202, as shown in FIG. 10. Cavity 202 is a laser cavity or optical parametric oscillator with an active medium 204 pumped to emit a light 206. Two reflectors 208, 210 delimit cavity 202 and provide feedback to establish oscillation.

Light 206 serves as input light for mixer 200, which converts input light 206 to an output light 212. Mixer 200 has a QPM grating 214 with domains 216 arranged in a beam-modifying pattern 218. In this case beam-modifying pattern 218 is composed of a single array of domains 216 arranged in a parabolic pattern. The parabolic pattern of domains 216 enables mixer 200 not only to perform intra-cavity frequency conversion but also to act as an intra-cavity beam-guiding element. Thus, cavity 202 does not require any additional lenses, apertures or optical elements for intra-cavity beam-guiding. A person skilled in the art will recognize that such a nonlinear beam-guiding element can also be used for mode-locking a laser.

Clearly, mixers in accordance with the invention can be implemented in laser oscillators, optical parametric oscillators or amplifiers and a large variety of other optical devices and systems. They can be used to perform frequency conversion in co-propagating and counter-propagating geometries and to simultaneously provide the appropriate beam-guiding functions. It should also be noted that mixers according to the invention can be designed to work at various angles of incidence of input light. They can also emit output light at more than one angle (e.g., when using a number of sub-arrays).

In another type of mixer in accordance with the invention, where two input lights are used (e.g., sum frequency generation or difference frequency generation) one of the input lights can be used as an optical switch that controls the beam modification. For example, when mixers 30, 50, 70 or 90 are used for difference frequency generation instead of second harmonic generation, one uses two input lights (called the pump and the signal) and one obtains one output light (called the idler) whose propagation is modified. Since the idler is only produced when both the pump light and the signal light are present, it is possible to use the pump light as a switch to turn on and off the beam modification (i.e., the focusing, defocusing, steering or shaping) as desired. This modification can occur as rapidly as the modulation of the pump light itself and forms the basis for an optical switch.

A person skilled in the art will recognize that the above-described embodiments are merely exemplary. In a more general case a mixer according to the invention can employ an array of features making up the beam-modifying pattern that exhibits variations in transverse and/or longitudinal grating period, amplitude, duty cycle, size (length, width, height, extent), shape, alignment, distribution or configuration. Furthermore, the tuning of the mixer can be done not only by displacing the mixer or changing the angle or location of incidence of the input light, as describe above, but also by varying other parameters of the mixer's environment. For example, the mixer can be tuned by varying the temperature, pressure, electric field, magnetic field, acoustic field and any other types of fields or parameters that permit the user to alter the features of the beam-modifying pattern.

Figure 11:
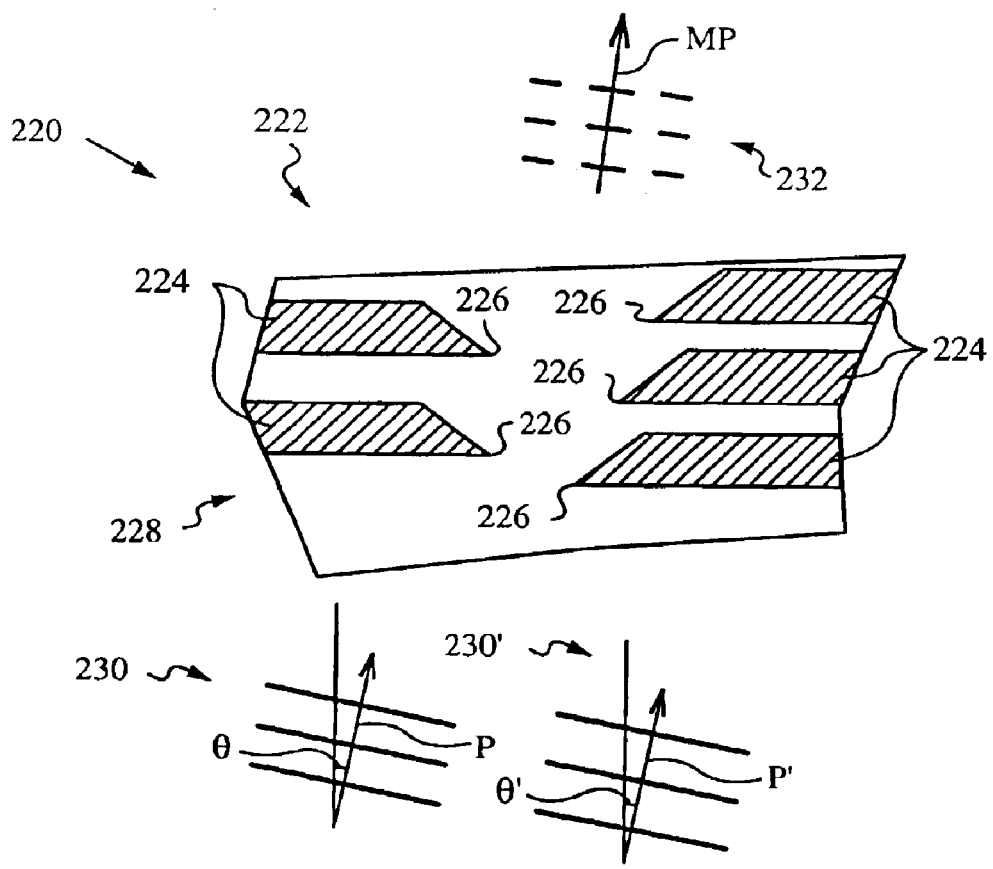
FIG. 11 is a diagram illustrating the use of edges to shape the wave front by diffraction.

FIG. 11, shows a portion of a nonlinear mixer 220 with a QPM grating 222 of domains 224. In this embodiment, an irregular spacing of domains 224 and edges 226 of domains 224 make up a beam-modifying pattern 228. The irregular spacing of domains 224 modifies the propagation of light by phase front shaping while edges 226 modify the propagation of light by diffraction. It should be noted that this modification differs as a function of propagation angle. A first input light 230 propagating along propagation direction P at angle θ and a second input light 230' propagating along direction P' at angle θ' produce an output light 232 by a nonlinear mixing process (e.g., difference frequency generation). The wave fronts of output light 232 are shaped by the irregular spacing of domains 224 and by diffraction at edges 226 such that the propagation of output light 232 is modified and output light 232 exits mixer 220 along a modified propagation direction MP. It should be noted that angles of incidence θ, θ' of first and second input light 230, 230' can be adjusted to further control the overlap of input light 230, 230' and the modified propagation direction MP of output light 232.

FIG. 12, illustrates yet another nonlinear mixer 240 with a QPM grating 242 of domains 244 making up a beam-modifying pattern 246. QPM grating 242 has a non-uniform grating phase. In other words, domains 244 are non-uniform across a width W of a beam of input light 248 propagating along propagation direction P. Domains 244 are large in comparison to the wavelength $\lambda_{in}$ of input light 248 and have no hard edges or features to shape the wave front of an output light 250 by diffraction. Instead, domains 244 extend across entire width W of beam of input light 248 and perform wave front shaping by phase front shaping of output light 250.

Of course, nonlinear mixers according to the invention can be used in various schemes and arrangements included cascaded nonlinear mixing processes. FIG. 13 illustrates schematically the use of a nonlinear mixer 260 with two QPM gratings 262, 264 having beam-modifying patterns (not shown). In this case, QPM gratings 262, 264 are positioned for cascaded nonlinear mixing processes performed on one or more input lights, e.g., such as input lights 266, 268 to generate an output light 270. In this embodiments the cascaded nonlinear mixing processes are performed in serially arranged QPM gratings 262, 264, but the one or more cascaded nonlinear mixing processes can take place in the same QPM grating.

FIG. 14 illustrates a nonlinear mixer 280 with a QPM grating 282 having a beam-modifying pattern (not shown) in a counter-propagating scheme. A first input light 284 is incident from the left to generate an output light 286 in a first nonlinear frequency conversion process. A second input light 288 is incident from the right to generate an output light 290 in a second nonlinear frequency conversion process. It should be noted that the first and second nonlinear frequency conversion processes could be the same or different. For example, input light 284 can produce output light 286 in a first nonlinear mixing effect and output light 286 can simultaneously produce a second output light (not shown) in a cascaded nonlinear mixing process occurring simultaneously in QPM grating 282. In fact, second output light can be of the same frequency as input light 284. It should also be noted, that more than one input light can be used from each side and the counter-propagating processes could be cascaded, e.g., by positioning a mirror at the location indicated in dashed lines.

Depending on the application, nonlinear mixers of the invention can be integrated into waveguide systems. In fact, in some embodiments the mixer can be integrated into a waveguide such as a planar waveguide to which the input and output light is confined. Some appropriate waveguides include planar lithium niobate waveguides, silica on silicon waveguides, or semiconductor waveguides.

A person skilled in the art will recognize that mixers according to the invention can be operated in the pulsed as well as continuous-wave (cw) operating mode. In addition, they can be designed for performing any nonlinear frequency conversion including harmonic and sub-harmonic generation.

Because of the multiplicity of possible embodiments, of which the ones described above are merely exemplary, the breadth of the invention should be determined based on the appended claims and their legal equivalents.

What is claimed is:

1. A nonlinear frequency mixer for generating at least one output light from at least one input light, said nonlinear frequency mixer comprising:
   a) a quasi-phase-matching grating comprising domains of nonlinear optical susceptibility $\chi$ for quasi-phase-matching said at least one input light and said at least one output light;
   b) a beam-modifying pattern in said quasi-phase-matching grating comprising features for wave front shaping of said at least one output light thereby modifying the propagation of said at least one output light.

2. The nonlinear frequency mixer of claim 1, wherein said features are substantially on the order of a wavelength of said at least one output light.

3. The nonlinear frequency mixer of claim 2, wherein said features comprise said domains.

4. The nonlinear frequency mixer of claim 2, wherein said features comprise spacings between said domains.

5. The nonlinear frequency mixer of claim 1, wherein said features extend across a beam width W of said input light.

6. The nonlinear frequency mixer of claim 5, wherein said features comprise edges of said domains and said wave front shaping comprises diffraction produced by said edges.

7. The nonlinear frequency mixer of claim 6, wherein said features comprise said domains and said domains have a non-uniform grating phase such that said wave front shaping comprises phase front shaping.

8. The nonlinear frequency mixer of claim 1, wherein said nonlinear optical susceptibility $\chi$ is a second-order susceptibility $\chi^{(2)}$.

9. The nonlinear frequency mixer of claim 1, wherein said features comprise said domains.

10. The nonlinear frequency mixer of claim 9, wherein said beam-modifying pattern comprises an array of said domains.

11. The nonlinear frequency mixer of claim 10, wherein said array comprises a parabolic array of said domains.

12. The nonlinear frequency mixer of claim 10, wherein said array comprises a Fresnel zone plate built up of said domains.

13. The nonlinear frequency mixer of claim 10, wherein said array comprises linear sub-arrays of said domains.

14. The nonlinear frequency mixer of claim 13, wherein said linear sub-arrays are positioned at predetermined offsets.

15. The nonlinear frequency mixer of claim 10, wherein said domains are of equal size.

16. The nonlinear frequency mixer of claim 1, comprising a photonic crystal selected from the group consisting of lithium niobate, lithium tantalate, KTP, RTA, KTA, RTP, and a ferroelectric crystal.

17. The nonlinear frequency mixer of claim 1, comprising a material having a nonlinear optical susceptibility $\chi$ selected from the group consisting of crystalline materials, polycrystalline materials, ceramics, glasses, amorphous materials, liquids, gases, gels, semiconductors and insulators.

18. The nonlinear frequency mixer of claim 1, further comprising an external device selected from the group consisting of optical cavity, laser oscillator, optical parametric oscillator and optical amplifier.

19. The nonlinear frequency mixer of claim 1, wherein said beam-modifying pattern comprises a nonuniformity in said quasi-phase-matching grating along a direction of propagation of said at least one output light.

20. The nonlinear frequency mixer of claim 1, wherein said beam-modifying pattern comprises a nonuniformity in said quasi-phase-matching grating transverse to a direction of propagation of said at least one output light.

21. A method for modifying the propagation of at least one output light in a nonlinear frequency mixer comprising:
   a) admitting at least one input light into said nonlinear frequency mixer to generate said at least one output light via at least one nonlinear wave mixing process;
   b) quasi-phase-matching said at least one input light and said at least one output light with a quasi-phasematching grating comprising domains of nonlinear optical susceptibility $\chi$;

c) providing a beam-modifying pattern in said quasi-phase-matching grating, said beam-modifying pattern comprising features for wave front shaping of said at least one output light thereby modifying the propagation of said at least one output light.

22. The method of claim 21, wherein said features are substantially on the order of a wavelength of said at least one output light such that said wave front shaping comprises diffraction.

23. The method of claim 21, wherein said features comprise said domains and said domains have a non-uniform grating phase such that said wave front shaping comprises phase front shaping.

24. The method of claim 23, wherein said domains are arranged to produce a beam-modifying effect selected from the group consisting of focusing, defocusing, steering, splitting and collimating.

25. The method of claim 21, wherein said at least one nonlinear wave mixing process comprises a three-wave mixing process.

26. The method of claim 25, wherein said three-wave mixing process is selected from the group consisting of harmonic and sub-harmonic generation, second harmonic generation, sum frequency generation, difference frequency generation, optical parametric generation, optical parametric amplification, optical parametric oscillation and optical rectification.

27. The method of claim 26, wherein said at least one nonlinear wave mixing process comprises at least one cascaded three-wave mixing process.

28. The method of claim 26, wherein said at least one cascaded three-wave mixing process comprises at least two nonlinear wave mixing processes performed in a counter-propagating scheme.

29. The method of claim 21, wherein said at least one nonlinear wave mixing process comprises cascaded nonlinear wave mixing processes wherein said input light and said output light have the same wavelength.

30. The method of claim 29, wherein said cascaded nonlinear wave mixing processes are performed in a counter-propagating scheme.

31. The method of claim 21, wherein said at least one nonlinear wave mixing process comprises a four-wave mixing process.

32. The method of claim 21, wherein said at least one nonlinear wave mixing process comprises at least two nonlinear wave mixing processes performed in a counter-propagating scheme.

* * * * *